Sept. 30, 1958 H. L. THOLSTRUP 2,854,118

CONTROL SYSTEM FOR TAPE READERS

Filed April 30, 1956 5 Sheets-Sheet 1

INVENTOR.

HENRY L. THOLSTRUP

BY [signature]

ATTORNEY

Sept. 30, 1958 H. L. THOLSTRUP 2,854,118

CONTROL SYSTEM FOR TAPE READERS

Filed April 30, 1956 5 Sheets-Sheet 2

Sept. 30, 1958 H. L. THOLSTRUP 2,854,118

CONTROL SYSTEM FOR TAPE READERS

Filed April 30, 1956 5 Sheets-Sheet 3

Sept. 30, 1958 H. L. THOLSTRUP 2,854,118

CONTROL SYSTEM FOR TAPE READERS

Filed April 30, 1956 5 Sheets-Sheet 4

United States Patent Office 2,854,118
Patented Sept. 30, 1958

2,854,118

CONTROL SYSTEM FOR TAPE READERS

Henry L. Tholstrup, Rochester, N. Y., assignor to Commercial Controls Corporation, Rochester, N. Y., a corporation of Delaware Application April 30, 1956, Serial No. 581,589

5 Claims. (Cl. 197—20)

This invention relates to apparatus for processing data represented in coded form, and more particularly to a system including a control tape reader and a printer adapted to be controlled by a punched paper tape being read in the tape reader.

In apparatus of the type referred to, it is customary to use a record strip or tape on which code designations have been successively recorded to represent, respectively, according to a selected combinational code, the intelligence, or data, which it is desired to process and certain functional signals for controlling the operation of the printer.

In the use of systems of the class described, it is highly desirable to read a single combinational code from a record tape, and that such code-by-code reading from the central tape be under the control of the operator.

It is, therefore, an object of the invention to provide a control system for a punched tape reader such that manipulation of a single control will cause automatic sequential reading of codes in the tape reader to be suspended and replaced by the code-by-code reading of a sequence of codes so long as the control for this purpose is manually manipulated.

It is the specific object of this invention, therefore, to provide a run-step switch, which when in one position will permit the automatic sequential reading of codes from punched tape in the tape reader, but which when placed into a second position, will result in the suspension of the automatic sequential reading of codes and result in the reading of a single code, while the switch is so manipulated.

Other objects of the invention will be pointed out in the following description and claims, which are to be read in light of the drawings which disclose, by way of example, two forms of a run-step switch circuit capable of performing the stated objectives.

Figure 1:
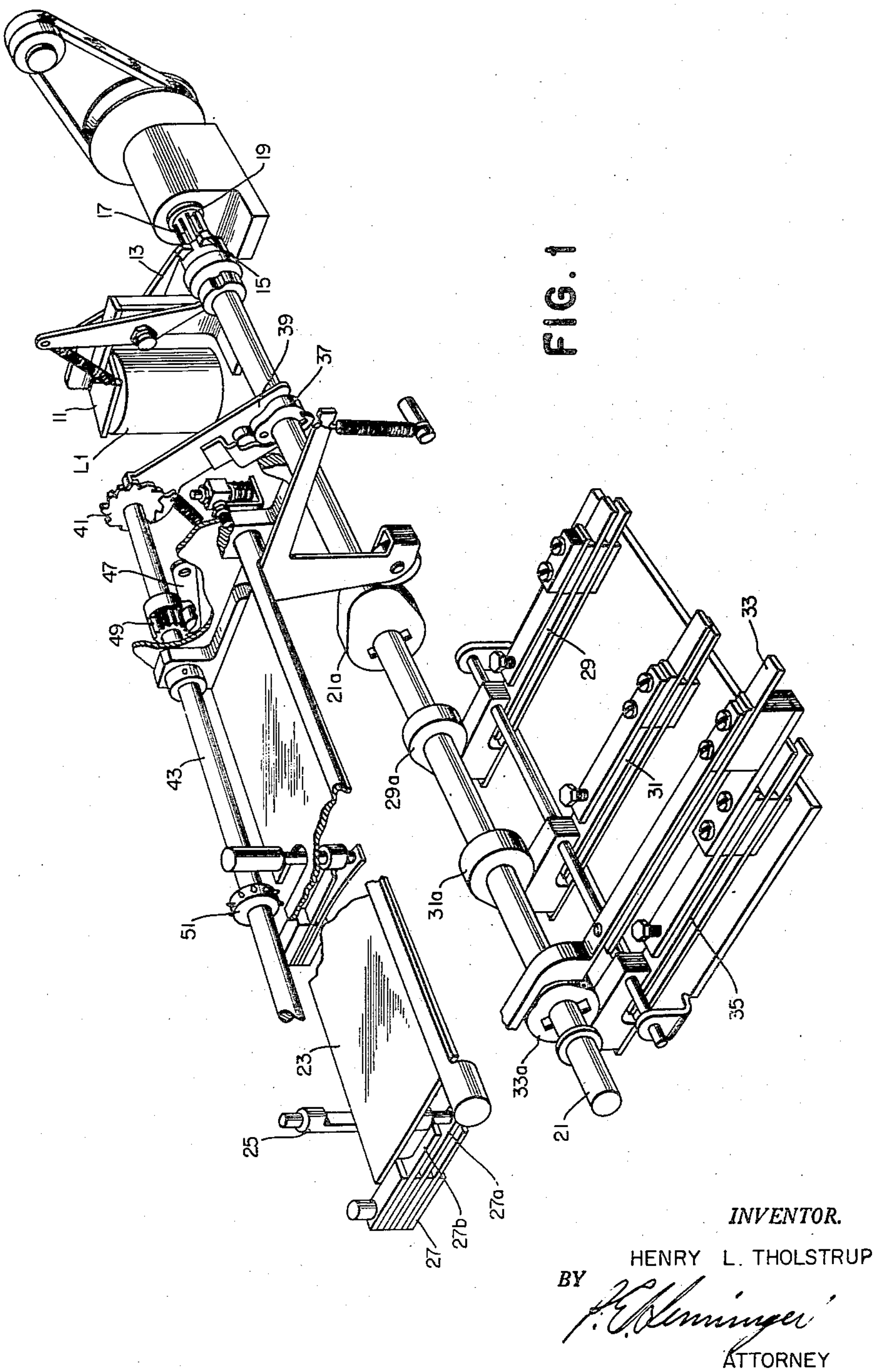
Figure 2A:
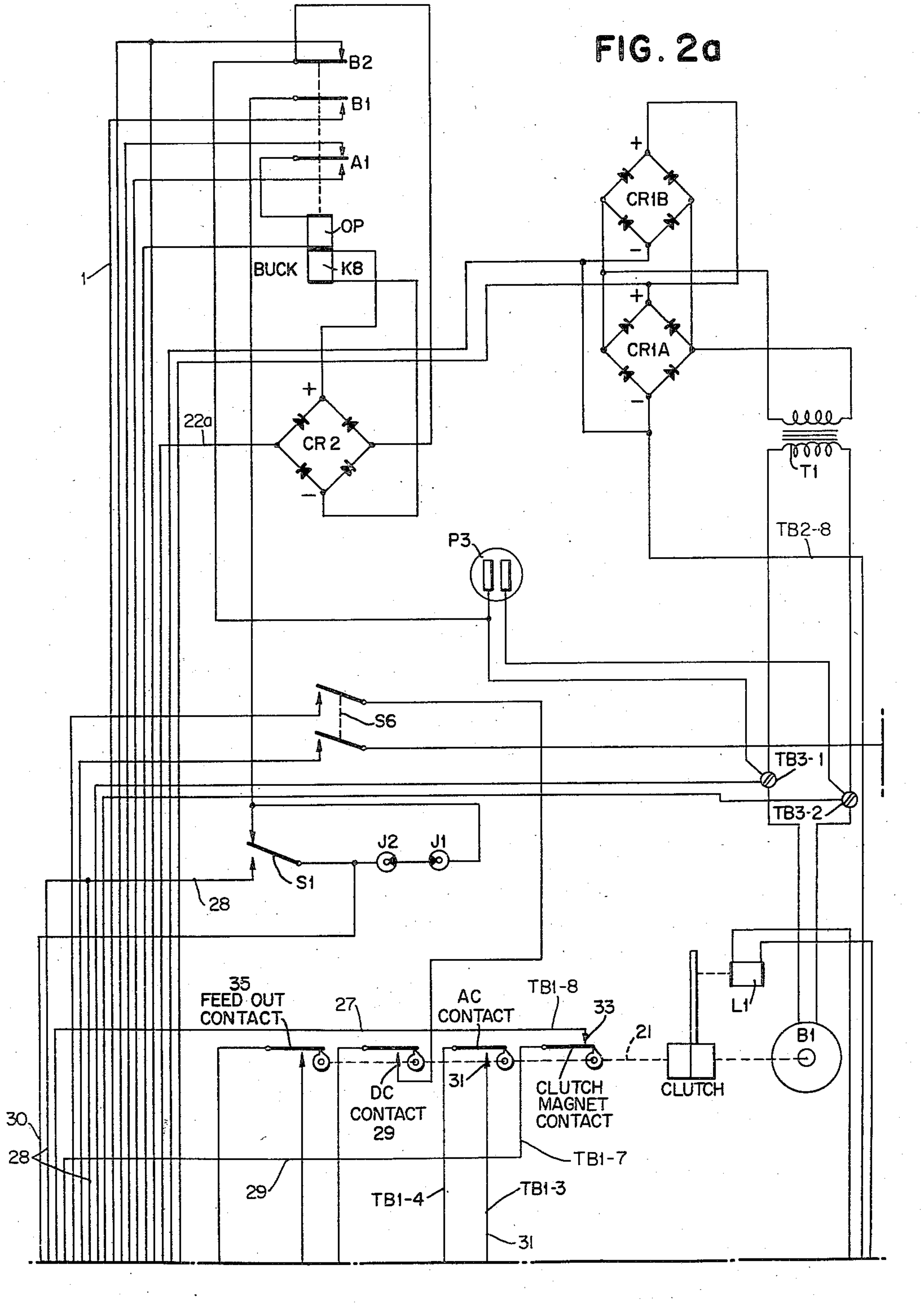
Figure 2B:
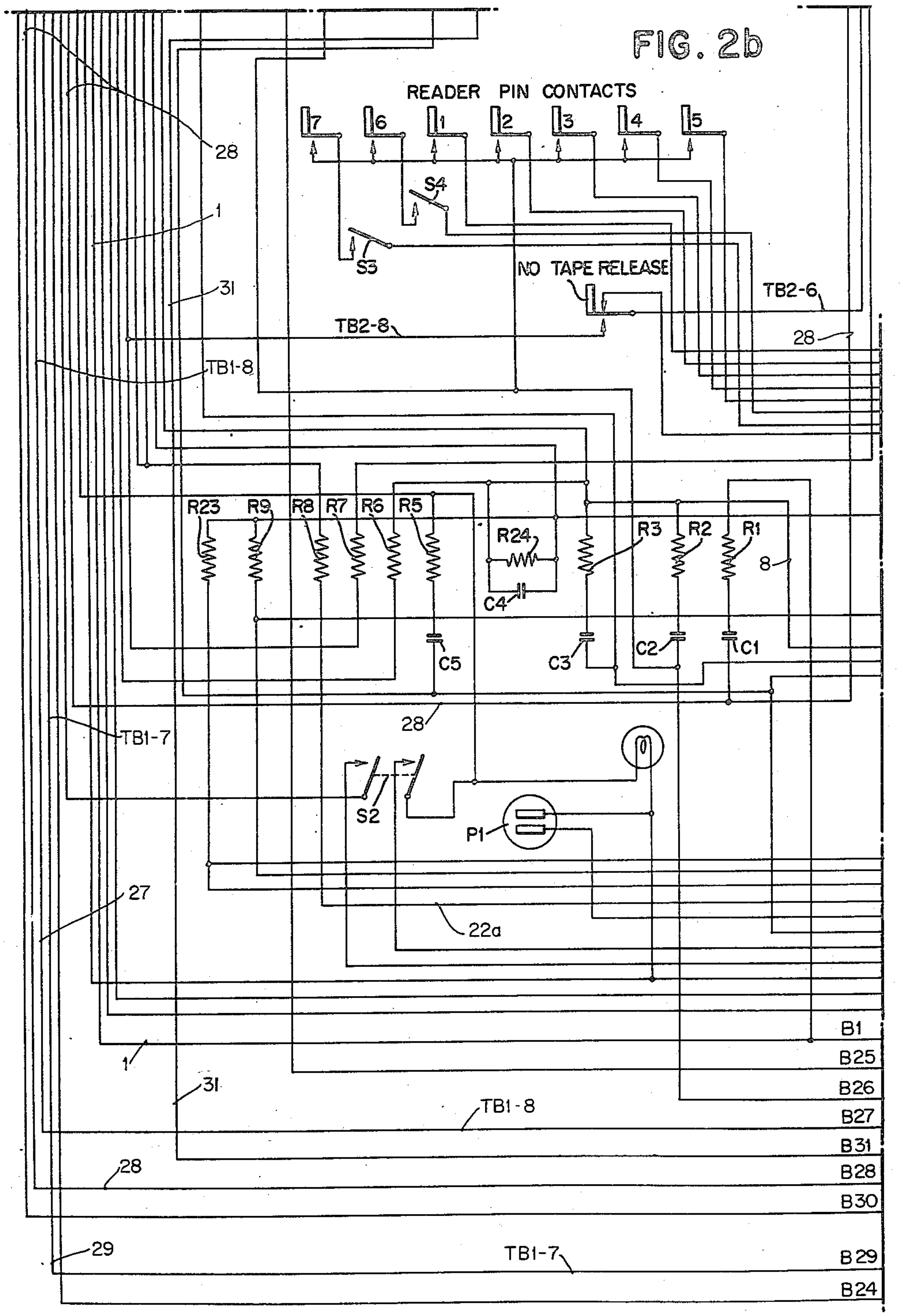
Figure 2C:
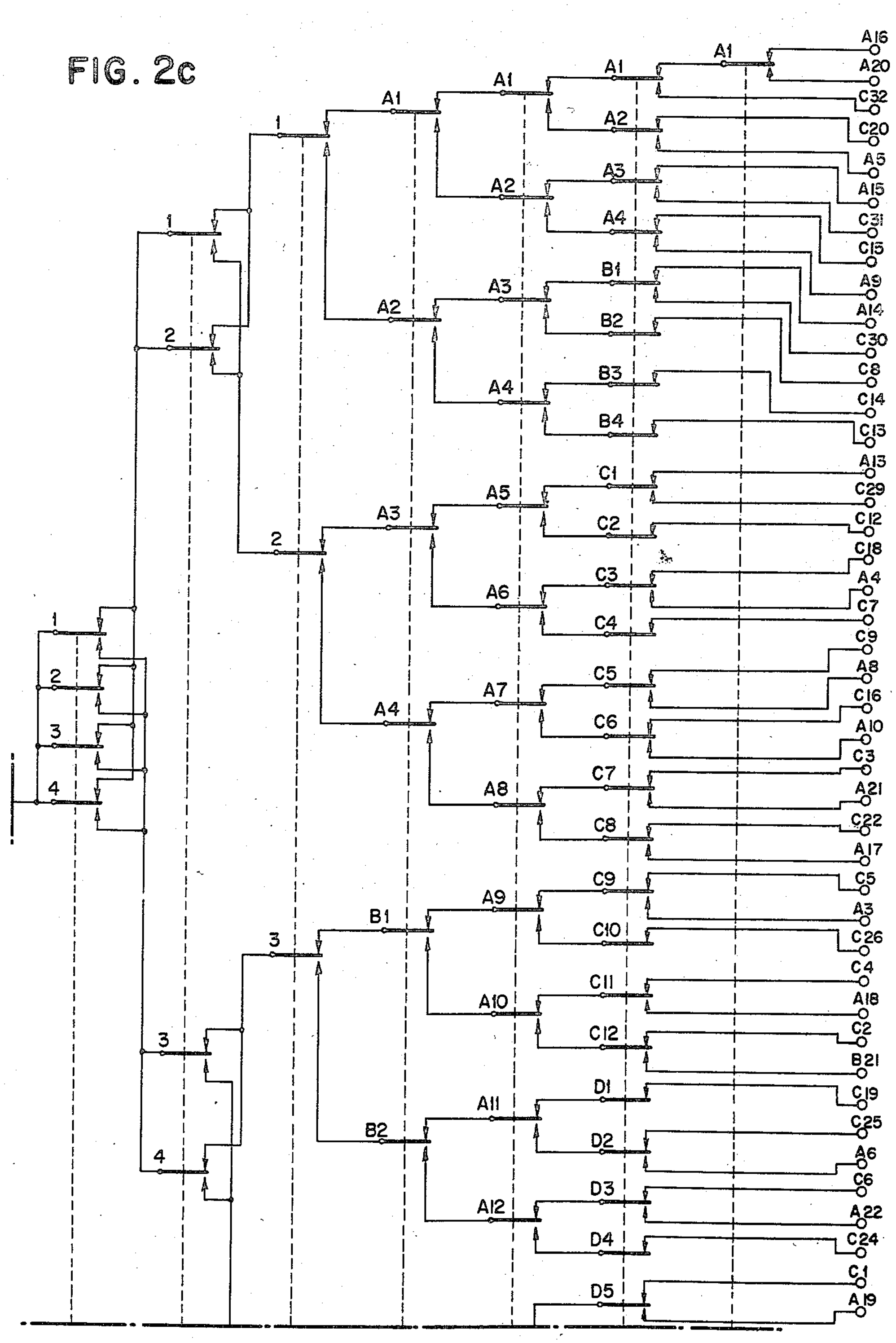
Figures 2D, 3:
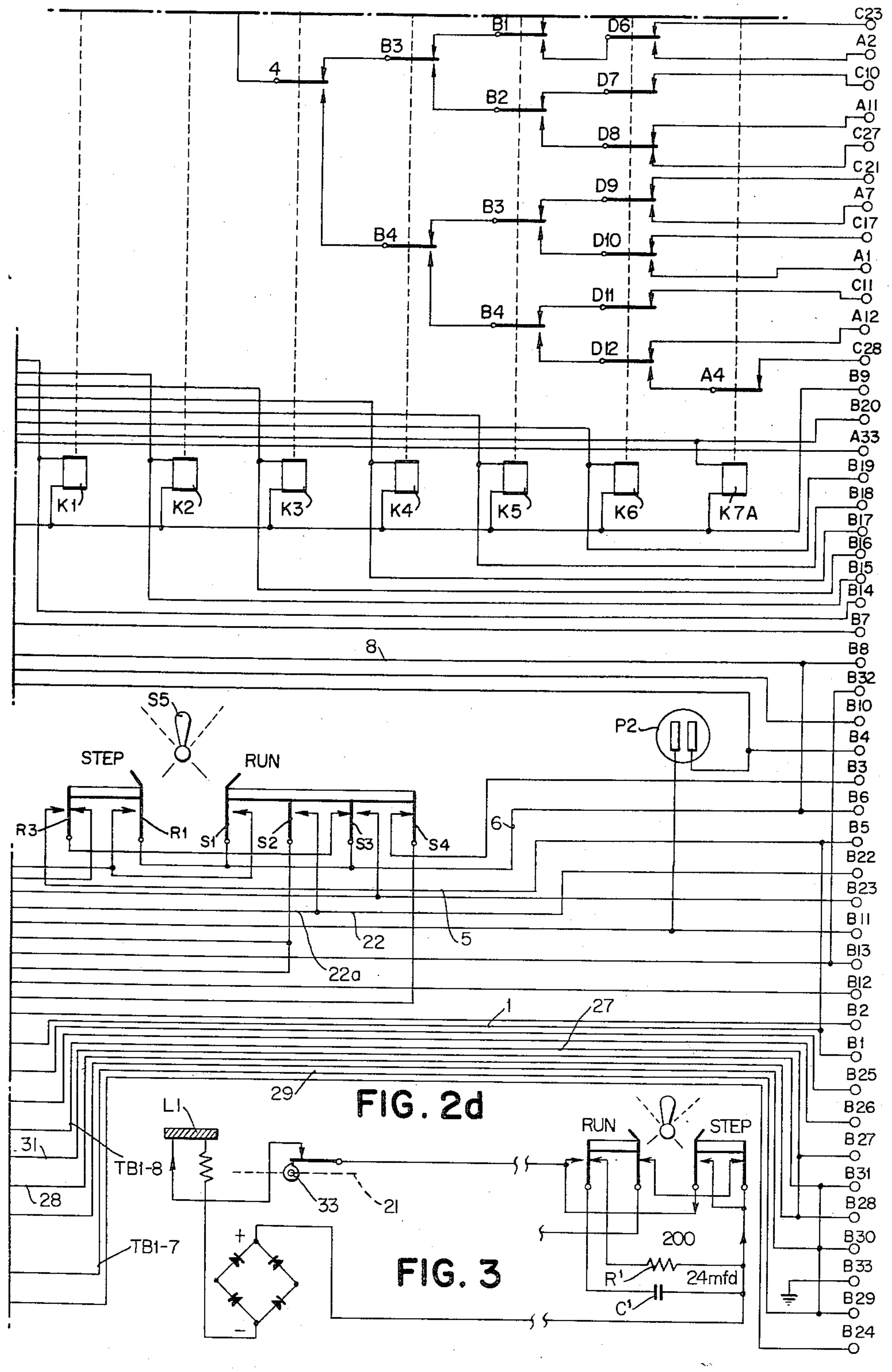

Figure 1 illustrates the essentials of a tape reader to which is applied the control system of the invention;

Figs. 2*a* through 2*d* constitute, in diagrammatic form, the control system of the tape reader; and Fig. 3 is a wiring diagram of a modified reader step-run switch circuit.

The tape reader is of the general type shown in my Patent No. 2,378,371, and only such fundamentals thereof need be illustrated and described herein to show the application of the present invention thereto. The tape reader has as its primary function the translation of characters, represented by a combination of code holes punched in a paper tape, to generate a single electrical signal for each combination of holes in the tape. The signals read from the tape are routed through a relay translating network such as that shown in my aforesaid patent wherein the combination of signals obtained upon the reading of a data field in the tape is translated into a single electrical impulse representative of the character or function called for by the code. From the relay translating network the respective signals may be transmitted to the operating solenoids of an electric typewriter such as in my prior Patent No. 2,436,126, issued February 17, 1948, or to selector magnets of a punch such as in A. W. Mills et al. Patent No. 2,346,267, issued April 11, 1944.

When the coded tape is fed through the reader, feeler pins move up through code holes in the tape. A contact will close under each feeler pin having a code hole above it. The contacts of the feeler pins are electrically connected to their respective relays in the translating network. Therefore, each time a feeler pin moves through a code hole in a tape its corresponding relay in the translating network is energized. The relays in the translator set up an A. C. path to a typewriter solenoid, for example, which corresponds to the code in the tape, and this solenoid pulls down its respective key lever, typing a character or operating a function as the case may be. When the reader is directly connected to a punch for the purpose of reproducing tape, the selector magnets in the punch are energized when a corresponding feeler pin contact in the reader closes. The punch will perforate a duplicate of the tape being read in the reader if directly connected.

Fig. 1 is a fragmentary drawing of the essential elements of the tape reader which is deemed sufficient to explain the fundamentals of the reader mechanism. In this figure, when the clutch magnet coil L1 is energized in the reader, it attracts the clutch magnet armature 11 which releases the clutch lever 13, allowing the clutch dog 15 to engage a tooth in the ratchet 17 of the continuously running ratchet shaft 19. This starts the clutch cam shaft 21 to rotate, moving the pin operating blade 23, which in turn releases the feeler pins 25. The pins 25 which move in a guide block (not shown) rest on a movable contact spring 27. When the operating blade releases the pins 25, the tension of the spring contacts 27 forces the feeler pins 25 up through the holes in the tape table (not shown) and against the tape being read. If there is a code hole in the tape above any pin, the movable pin contact **27*a* will force the feeler pin through the code hole in the tape. At approximately 14° rotation of the clutch shaft the movable pin contacts will close a circuit with a stationary contact 27*b*** located just above it.

Each contact pin is connected to a level of translator relays. When the clutch shaft 21 has rotated approximately 47°, a D. C. common contact 29 closes, energizing the translator relay coils corresponding to the code holes in the tape. An A. C. common contact 31 closes at approximately 104° rotation of the shaft. This allows enough time for the selected set of relays to become energized and fully operative. When the A. C. common contact 31 closes, it closes a path through the translator relays to a solenoid in the typewriter or to the selector magnets in the punch, if the reader is directly connected to the punch. If the circuit is connected to the typewriter, a typewriter control solenoid becomes energized, tripping the corresponding cam and typing a character or performing a function as the case may be. A pair of clutch magnet contacts 33 are adjusted so that they open at about 53° rotation of the clutch shaft. This breaks the direct current source to the clutch magnet coil, deenergizing it and releasing the clutch magnet armature. There are a set of feed out contacts 35 which close at approximately 166° rotation of the shaft. This completes a positive direct current circuit to the punch clutch magnet (if the reader is directly connected to the punch) through the interconnecting cable. The alternating current common contacts 31 open about 20° sooner than the direct current common contacts 29 to prevent possible arcing of the translator relay points. The alternating current contacts 31 break at about 245° rotation. By cam action the pin operating blade 23 moves the feeler pins 25 down, and at approximately 285° rotation, the feeler pin contacts 27*a*–27*b* open. At about 300° rotation of the cam shaft, a feed cam 37 operates a feed arm 39 which engages a tooth in a ratchet 41 on a feed shaft 43. This action rotates the feed shaft one position, placing the next set of code holes in line with the feeler pins. A detent 47 engages a detent ratchet 49, holding a tape feed sprocket 51 locked in position. The clutch magnet cam contacts 33 close at about 344° rotation of the cam shaft, but the energizing of the clutch magnet coil depends also upon other contacts in the circuit which will be explained later. The clutch magnet armature 11 engages the clutch lever which pulls the dog out of the drive ratchet, stopping the reader operation.

By reference to Fig. 2*b*, it will be seen that power is applied to the reader circuit through a plug P1 which may be connected to a 115 volt, 60 cycle source of power. This applies power to the reader motor B1 (Fig. 2*a*) and to the primary coil of the reader transformer T1 (Fig. 2*a*). The step-down secondary voltage of the transformer is approximately 52 volts, and this is supplied to the reader rectifiers CR1A and CR1B. The power switch S2 (Fig. 2*b*) of the reader breaks one side of the alternating current line in the "off" position.

The power supplied to the rectifiers CR1A and CR1B by the transformer T1 results in an output of approximately 75 volts D. C. A positive D. C. voltage is on the D. C. common contact whenever the power switch S2 is closed. Also, when the reader run-step switch S5 (Fig. 2*d*) is in the neutral position and the no tape release contact (Fig. 2*b*) is closed, a direct current circuit will be completed to the operate coil of a delay control relay K8 (Fig. 2*a*).

When the reader run-step switch S5 is in the neutral position, and the no tape release switch is closed and the reader power switch S2 is closed, the following circuit is completed: from the positive direct current side of the reader rectifiers CR1A and CR1B to the cable terminals B6 and B8, to the S3 contact of the run-step switch S5 (Fig. 2*d*), from the run-step switch contact S3 to its R3 contact and from thence to cable terminals B7 and B3 through the run-step switch S5 contact S4, to the A1 contact of the delay control relay K8 (Fig. 2*a*), line TB2–6 (Fig. 2*b*) and the no tape release switch and line TB2–8 to the negative side of the D. C. circuit. This results in energizing the operating coil of the delay control relay K8 (Fig. 2*a*) and the transfer of its A1 contact, completing a holding circuit as follows: from positive D. C. of the reader rectifiers CR1A and CR1B, resistor R6 (Fig. 2*b*), transferred A1 contact of the relay K8, and the no tape release switch to the negative direct current line.

In order to operate the reader, it is necessary to energize the clutch magnet coil L1. With the reader run-step switch S5 in the run position, and the no tape release contact closed (transferred from the position shown in the drawing) the following circuit is completed: from the positive direct current source of the reader rectifiers CR1A and CR1B, through the fuse F3 to the junction of the resistor R2, along the line 8 and to the plug terminal B8. The plug terminal B8 is connected to the plug terminal B6 and, therefore, the circuit will be returned through the line 6 to the S3 contact of the run-step switch S5. With the contact S3 closed, as shown, the circuit is continued to the R3 contact thereof, now transferred, and thus back through the line 5 to the cable terminal B5 which is connected to the cable terminal B1. Thus, the circuit is continued through the lead 1 to the B1 contact of the delay control relay K8, said contact now being closed. From the B1 contact of the relay, the circuit is continued through the plugs J1 and J2 to the clutch magnet switch S1, in the position shown in the drawing, and from thence along the line 30 to the plug terminal B30 which is connected to the plug terminal B29. The circuit is then returned through the line 29, through the point TB1–7 of the clutch magnet cam contact. From this point, the circuit continues through the clutch magnet contact TB1–8 back to the plug terminal B27, which is connected to the plug terminal B28, through the line 28 to the now open point of the clutch magnet switch S1 and to the clutch magnet coil L1. The return from the clutch magnet coil L1 is by way of the resistor R7 to the junction at the coil of the relay K8 and thence by line TB2–12 to the now closed point of the no tape release switch and by way of line TB2–8 to the negative side of the rectifiers CR1A and CR1B.

It has been stated that it is a purpose of this invention to provide means in the tape reader for stepping the tape a single data field at a time and reading that field without further feed of tape. The run-step switch S5 (Fig. 2*d*) when moved to its step position will result in the stated operation. When the run-step switch S5 is in the step position, the clutch magnet coil L1 is energized, starting a cycle of operation of the reader. At approximately 104° rotation of the reader clutch shaft 21, the A. C. common contact 31 closes, completing a circuit from the positive A. C. source on line 31, through line TB1–3, the A. C. common contact, line TB1–4, the transferred point S2 of the run-step switch S5, line 22, line 22*a*, a resistor R8, and through the rectifier CR2 to the alternating current ground. The direct current output of the rectifier CR2 energizes a buck coil on the delay control relay K8. The flux of the buck coil opposes the flux of the operating coil, thus releasing the armature of the relay K8 and thereby breaking the now closed B1 contact of the delay control relay K8. When the B1 contact of the relay K8 is opened, it breaks the clutch magnet circuit and thereby stops the reader. Therefore, due to the circuits described above, each step actuation of the reader run-step switch S5 will advance the tape one data field, but with the switch in the run position the tape will advance continuously.

An alternate control for stepping the tape of the reader from one data field to the next without continuous feeding and reading is shown in Fig. 3 wherein the run-step switch contains a condenser circuit which is directly connected to the L1 coil of the reader clutch magnet, and which permits a sufficient build-up of flux in the clutch magnet coil to operate the magnet for a single revolution. Fig. 3 is a diagrammatic drawing on which are shown the necessary circuits from the positive direct current source, and more particularly the switch contacts and electrolytic condenser of the run-step switch to the clutch magnet L1, and from there to the negative D. C. source. In this modification, the positive output of the rectifier is fed to a contact of the run-step switch, and from thence returning through the clutch magnet cam contact 33 to the clutch magnet coil and from the clutch magnet coil L1 to the negative side of the rectifier.

The run-step switch has a transfer point connected to the positive side of the circuit through a 24 microfarad electrolytic condenser C'. The time constant for charging the electrolytic condenser C' is such that as current is fed through the clutch magnet coil to charge the condenser, sufficient magnetic flux is built up in the core of the clutch magnet L1 to operate the clutch magnet and cause it to hold long enough for the reader shaft to make one revolution and then stop. When the run-step switch is returned to its normal position, a resistor R' associated in the condenser circuit will discharge the condenser C' so that on the next operation of the switch to the step position the reading of one data field of the tape will result. This operation, i. e., the alternate movement of the run-step switch from normal to step, permits the tape in the reader to be stepped along a single data field at a time for the reading of code holes in the respective fields so stepped.

When the tape reader is connected to a typewriter through the cable connection the seven reader pin contacts (Fig. 2*b*) or any of them, when closed, will operate the relays K1 through K7 (Fig. 2*d*) which correspond respectively to the reader pin contacts 1 through 7. Thus, as stated, a translating network is set up through the respective relay points, whereby the combinational signals are translated to a single corresponding signal for operating the typewriter solenoids, or the selector magnets of a tape punch.

In connection with the transmission of data that is read from tape in the tape reader, it is to be noted that the reader is adapted for the reading of a 5, 6 or 7 position code. In order to accommodate the transmission system to the reading of three different codes, the reader circuit includes switches S3 and S4 (Fig. 2*b*). The switch S3 is in the circuit connecting the reader pin with its translating relay K7, while the switch S4 is in the circuit connecting the reader pin contact 6 with its respective translator relay K6. If, therefore, a seven position code is to be read in the reader, the switches S3 and S4 must be closed. If a six position code is to be read, the seventh level of translating points must be cut out by opening the switch S3. Furthermore, if a five position code is to be read, the sixth level of the translator points will be disabled by opening the switch S4 also.

While the fundamentally novel features of the invention have been illustrated and described in connection with specific embodiments of the invention, it is believed that these embodiments will enable others skilled in the art to apply the principles of the invention in forms departing from the exemplary embodiments herein, and such departures are contemplated by the claims.

What is claimed is:

1. In a punched record reading device comprising a record reading station adapted to read a punched record in character-by-character sequence, electro-mechanical means for feeding a punched record through said record reading station in a continuous step-by-step sequence, a first electrical control circuit for said electro-mechanical record feeding means for effecting continuous step-by-step feed of a punched record in said reading station, a normally open second electrical control circuit for said electro-mechanical feeding means adapted when closed to interrupt said first electrical control circuit and apply a single operating pulse to said electro-mechanical record feeding means whereby the same is effective to feed a record a single step, and manual means for closing said second electrical control circuit.

2. In a punched record reading device comprising a record reading station adapted to read a punched record in character-by-character sequence, electro-magnetic clutch means for feeding a punched record through said record reading station in a continuous step-by-step sequence, a first electrical control circuit including a normally energized relay for said electro-magnetic clutch means for effecting continuous step-by-step feed of a punched record in said reading station, a normally open second electrical control circuit connected to said relay adapted when closed to interrupt said first electrical control circuit and apply a single operating pulse to said electro-magnetic clutch means whereby the same is effective to feed a record a single step, and manual means for closing said second electrical control circuit.

3. In a punched record reading device comprising a record reading station adapted to read a punched record in character-by-character sequence, electro-mechanical means for feeding a punched record through said record reading station in a continuous step-by-step sequence, a first electrical control circuit for said electromechanical record feeding means for effecting continuous step-by-step feed of a punched record in said reading station, a normally open second electrical control circuit for said electro-mechanical feeding means adapted when closed to apply a single operating pulse to said electro-mechanical record feeding means whereby the same is effective to feed a record a single step, and manual means for simultaneously opening said first electrical control circuit and closing said second electrical control circuit.

4. In a punched record reading device comprising a record reading station adapted to read a punched record in character-by-character sequence, electro-magnetic means for feeding a punched record through said record reading station in a continuous step-by-step sequence, a first electrical control circuit for said electro-magnetic record feeding means for effecting continuous step-by-step feed of a punched record in said reading station, a normally open second electrical control circuit for said electro-magnetic feeding means, a manual switch for simultaneously opening said first electrical control circuit and closing said second electrical control circuit, and a condenser circuit in said second electrical control circuit between said electro-magnetic feeding means and said switch effective to apply a single operating pulse to said electro-magnetic record feeding means whereby the same is effective to feed a record a single step.

5. In a punched record reading device comprising a record reading station adapted to read a punched record in character-by-character sequence, electro-magnetic means for feeding a punched record through said record reading station in a continuous step-by-step sequence, a first electrical control circuit for said electro-magnetic record feeding means for effecting continuous step-by-step feed of a punched record in said reading station, a normally open second electrical control circuit for said electro-magnetic feeding means, a manual switch for simultaneously opening said first electrical control circuit and closing said second electrical control circuit, and an impedance element in said second electrical control circuit between said electro-magnetic feeding means and said switch effective to apply a single operating pulse to said electro-magnetic record feeding means whereby the same is effective to feed a record a single step.

References Cited in the file of this patent

UNITED STATES PATENTS 2,378,371 Tholstrup ---------------- June 12, 1945